No. 773,969. PATENTED NOV. 1, 1904.
T. M. NORTH.
INKING AND TRIPPING MECHANISM OF ROTARY PRINTING MACHINES.
APPLICATION FILED AUG. 24, 1903.
NO MODEL. 9 SHEETS—SHEET 1.

Witnesses
Henry Hart.
Warwick Thy Williams

Inventor
Thomas Merrifield North
per Chas S. Woodroffe
Attorney

No. 773,969. PATENTED NOV. 1, 1904.
T. M. NORTH.
INKING AND TRIPPING MECHANISM OF ROTARY PRINTING MACHINES.
APPLICATION FILED AUG. 24, 1903.
NO MODEL. 9 SHEETS—SHEET 2.

No. 773,969. PATENTED NOV. 1, 1904.
T. M. NORTH.
INKING AND TRIPPING MECHANISM OF ROTARY PRINTING MACHINES.
APPLICATION FILED AUG. 24, 1903.
NO MODEL. 9 SHEETS—SHEET 3.

Witnesses
Henry Hart.
Warwick Thy Williams

Inventor
Thomas Merrifield North
per Chas S. Woodroffe
Attorney

No. 773,969. PATENTED NOV. 1, 1904.
T. M. NORTH.
INKING AND TRIPPING MECHANISM OF ROTARY PRINTING MACHINES.
APPLICATION FILED AUG. 24, 1903.
NO MODEL. 9 SHEETS—SHEET 4.

Fig. 4.

Witnesses
Henry Hart.
Warwick Wm. Williams

Inventor
Thomas Merrifield North
per Chas. S. Woodroffe
Attorney

No. 773,969. PATENTED NOV. 1, 1904.
T. M. NORTH.
INKING AND TRIPPING MECHANISM OF ROTARY PRINTING MACHINES.
APPLICATION FILED AUG. 24, 1903.
NO MODEL. 9 SHEETS—SHEET 6.

Fig. 6.

Witnesses
Henry Hart.
Warwick Wm Williams

Inventor
Thomas Merrifield North
per Chas S Woodroffe
Attorney

No. 773,969. Patented November 1, 1904.

UNITED STATES PATENT OFFICE.

THOMAS M. NORTH, OF ALTRINCHAM, ENGLAND, ASSIGNOR TO THE LINOTYPE COMPANY LIMITED, OF LONDON, ENGLAND.

INKING AND TRIPPING MECHANISM OF ROTARY PRINTING-MACHINES.

SPECIFICATION forming part of Letters Patent No. 773,969, dated November 1, 1904.

Application filed August 24, 1903. Serial No. 170,605. (No model.)

*To all whom it may concern:*

Be it known that I, THOMAS MERRIFIELD NORTH, of Kingswood Lodge, Ellesmere Road, Altrincham, county of Chester, England, have invented certain new and useful Improvements in the Inking and Tripping Mechanism of Rotary Printing-Machines; and I do hereby declare the following to be a full, clear, and exact description of the invention, such as will enable others skilled in the art to which it appertains to make and use the same.

The present invention relates to improvements in the inking and tripping mechanisms of printing-machines and which are applicable to any rotary machine issuing either a typographic form or a flexible metal plate as a printing-surface.

It consists in the combinations hereinafter described in connection with the accompanying drawings and claimed in the respective claims.

1 1 are the side frames of the machine; 2, the printing-cylinder; 3, its shaft turning in suitable bearings in the side frames 1 1; 4, the impression-cylinder; 5, its shaft, also turning in suitable bearings in the same side frames; 6, the gearing between the two cylinders 2 and 4, and 7 a portion of the inking mechanism. These parts are as heretofore.

8 8 8 are the vibrator-rollers of the inking mechanism, and they coöperate, as heretofore, with the rollers 9, that ink the printing-surface 10 of the printing-cylinder 2. They are journaled in fixed bearings in brackets 11, bolted to the side frames 1 1, and are rotated by a gear 12, fast on one end of the printing-cylinder 2 and which gear engages with intermediate spur-gears 13, turning on suitable stud-axles 14, fast to the respective brackets 11 on one side of the machine, and driving spur-pinions 15, fast on the axles 16 of the vibrator-rollers 8, respectively. These vibrator-rollers are vibrated by the following means.

Figure 8:
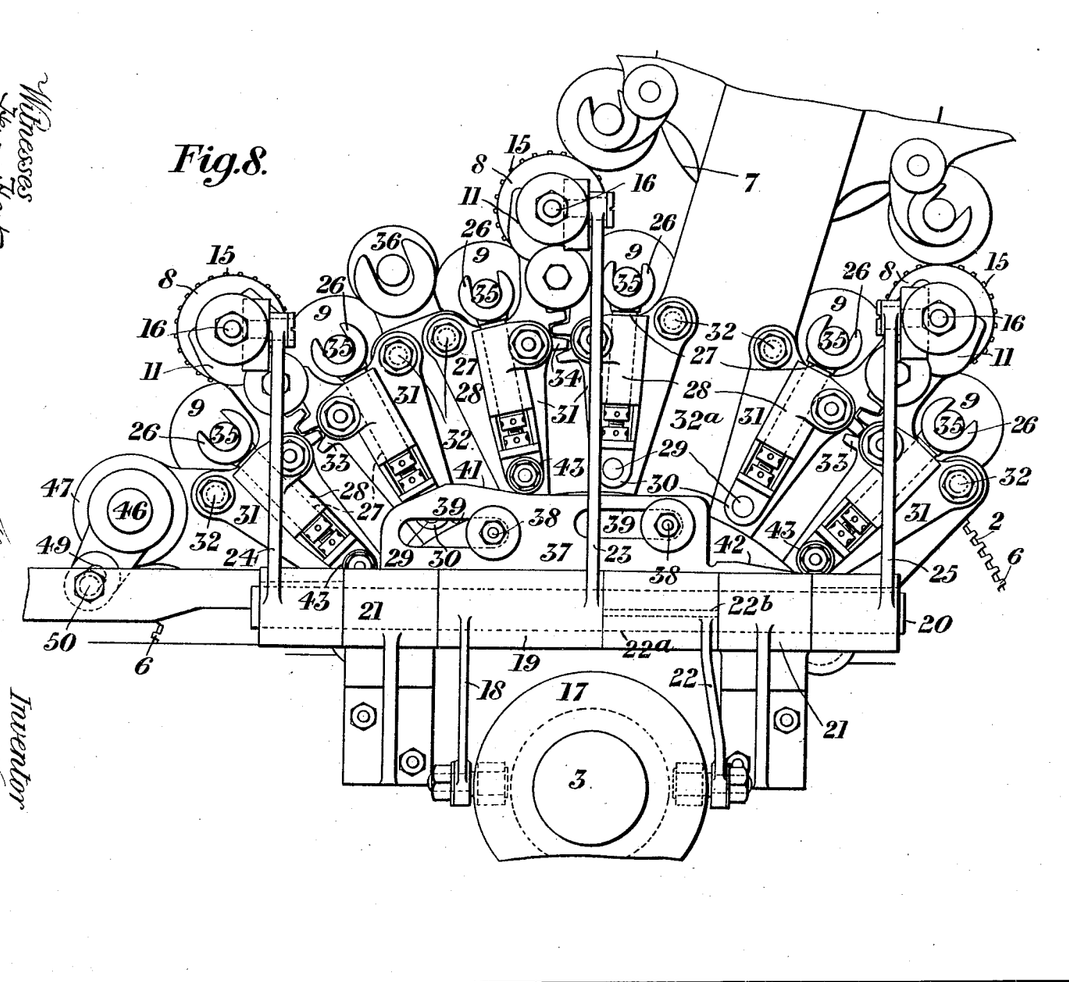
Fig. 8 is a side elevation corresponding with Fig. 6, but from the opposite side of the machine.
Figure 9:
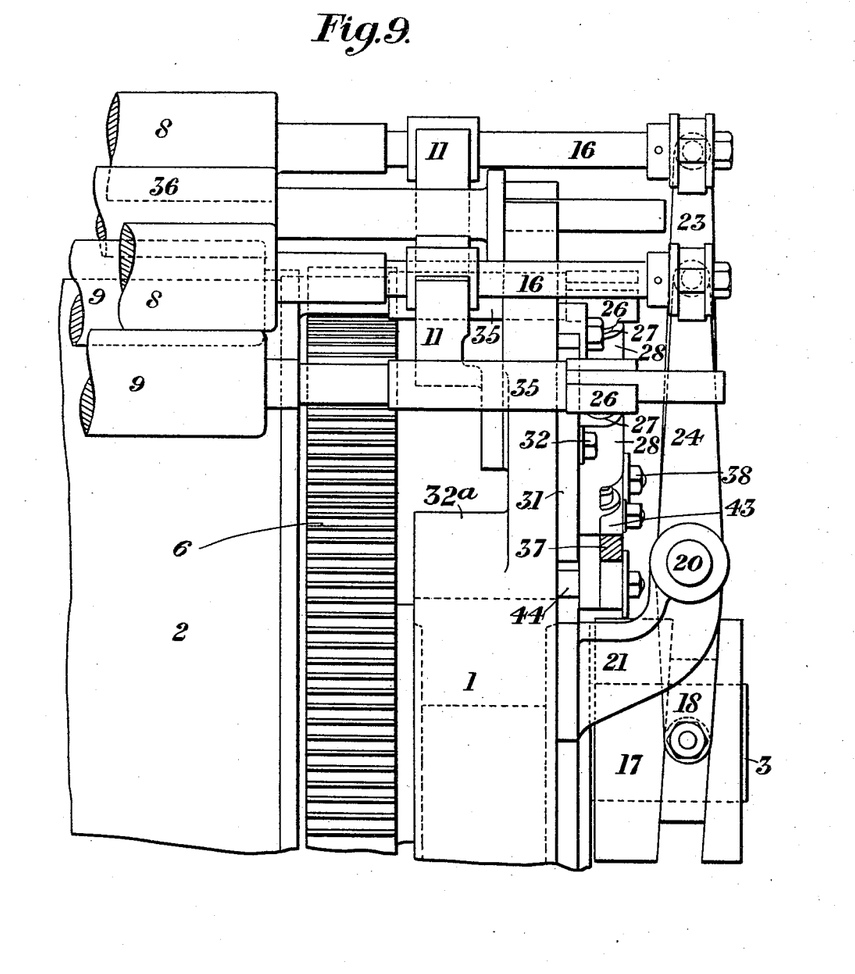
Fig. 9 is an elevation from the right hand of Fig. 8 of the means for vibrating the vibrator-rollers.

Referring to Fig. 8, 17 is a cam fast on the respective end of the shaft 3 of the printing-cylinder. 18 is an arm fast to a sleeve 19, loose on the shaft 20, from which it hangs in contact with the operative face of the cam 17, and 23 is a second arm likewise fast to the said sleeve 19, but upstanding therefrom to have its top end pivotally connected to the respective end of the middle vibrating roller 8. 22 is a third arm fast to a sleeve $22^a$, keyed to the shaft 20 by the key $22^b$. This arm 22, like the arm 18, hangs from its respective sleeve in contact with the operative face of the cam 17; but the two arms engage with the said cam on opposite sides of the axis of it. 24 25 are arms fast to the respective ends of the shaft 20 and upstanding therefrom like the arm 23; but it is to the outer ends of the outer vibrating rollers 8 8 that their top ends are respectively pivotally connected. The effect of the arms 18 and 22 being operated by opposite sides of the cam 17 is to vibrate the middle vibrating roller in one direction, while the outer vibrating rollers are vibrated in the opposite one.

Figure 1:
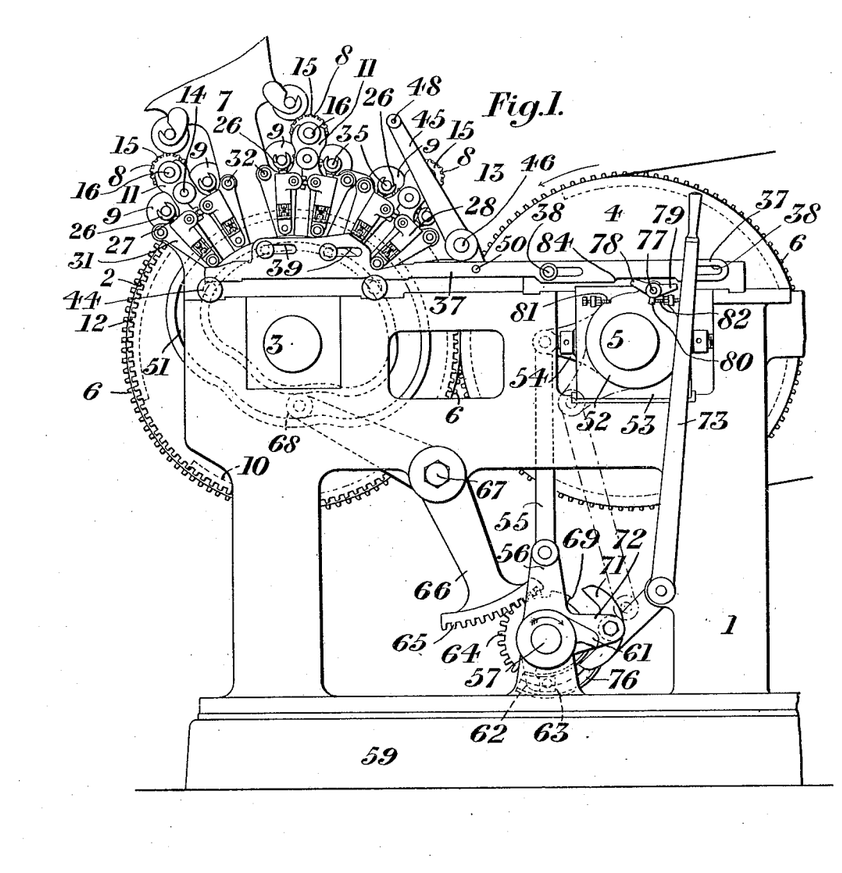
Figure 1 is a side elevation of as much of a printing-machine as the present invention concerns and includes the latter.
Figure 2:
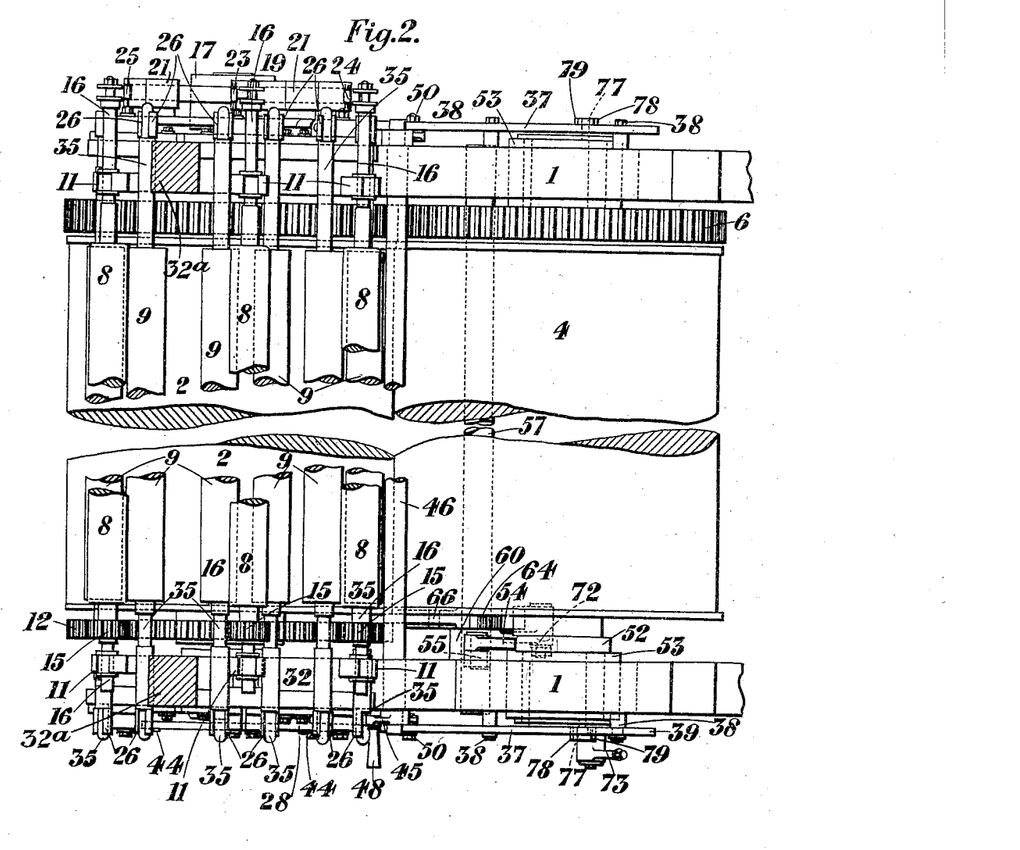
Fig. 2 is a plan corresponding therewith.
Figure 3:
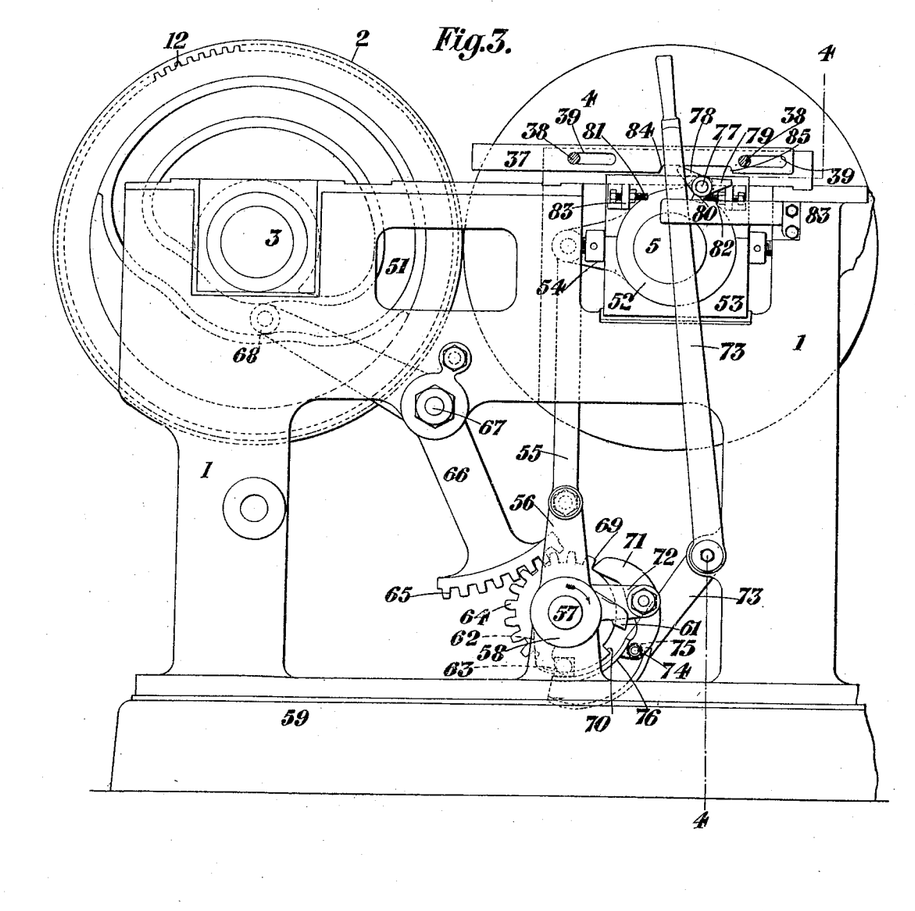
Fig. 3 is a side elevation, on an enlarged scale, of the tripping mechanism.
Figure 4:
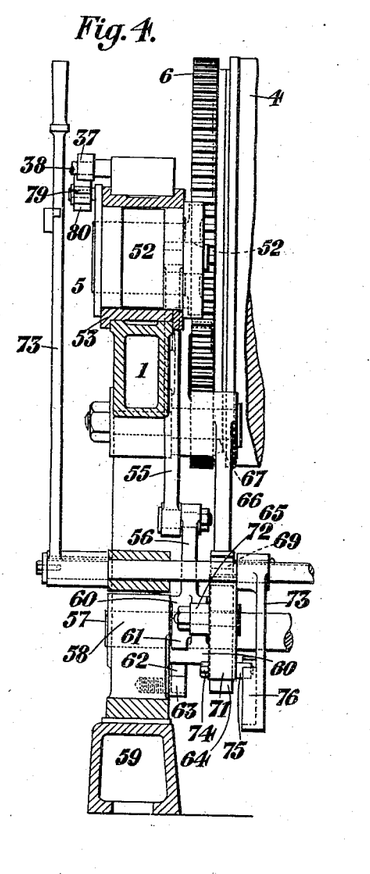
Fig. 4 is a section on line 4 4 of Fig. 3.
Figure 5:
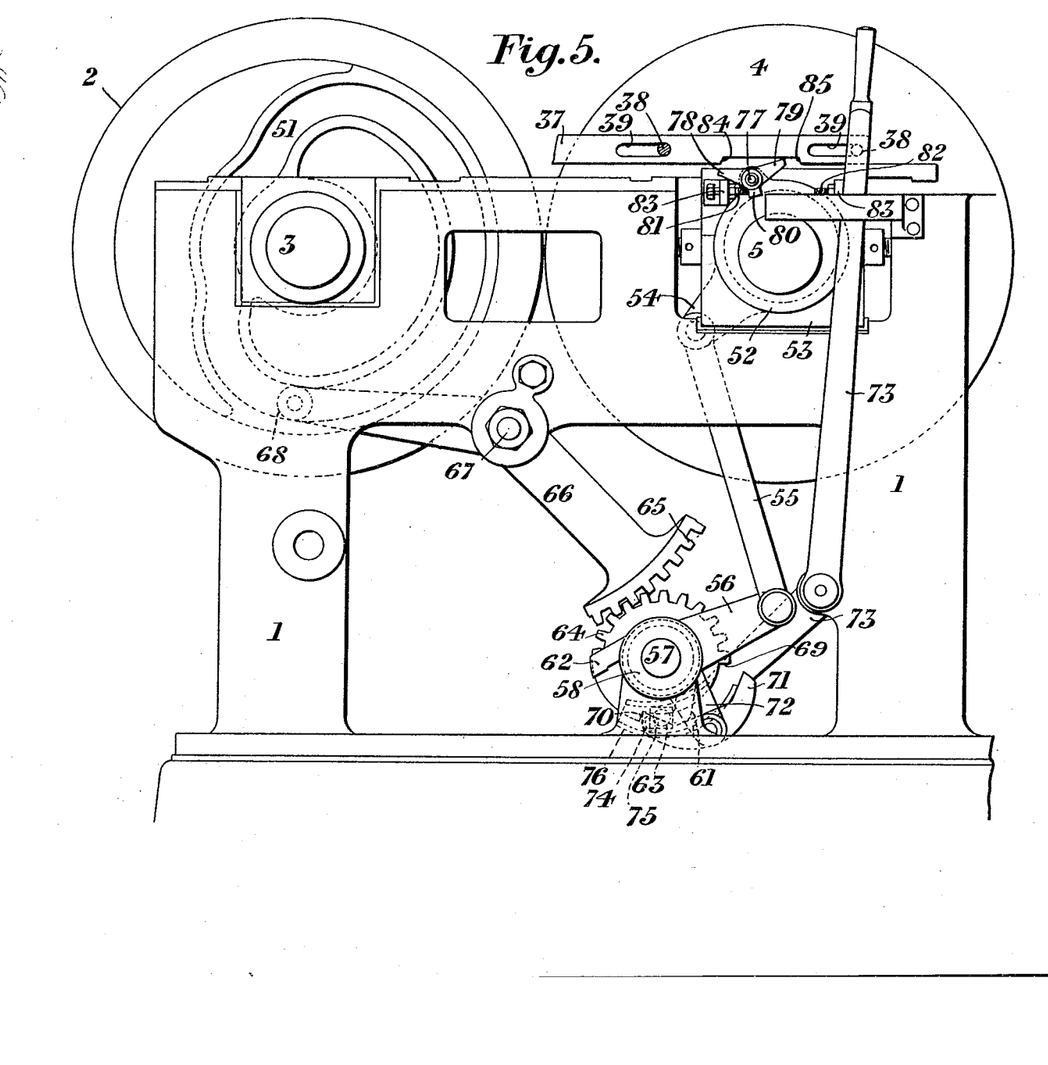
Fig. 5 is a side elevation of the tripping mechanism on the same scale as Fig. 3, but showing the impression-cylinder tripped.
Figure 6:
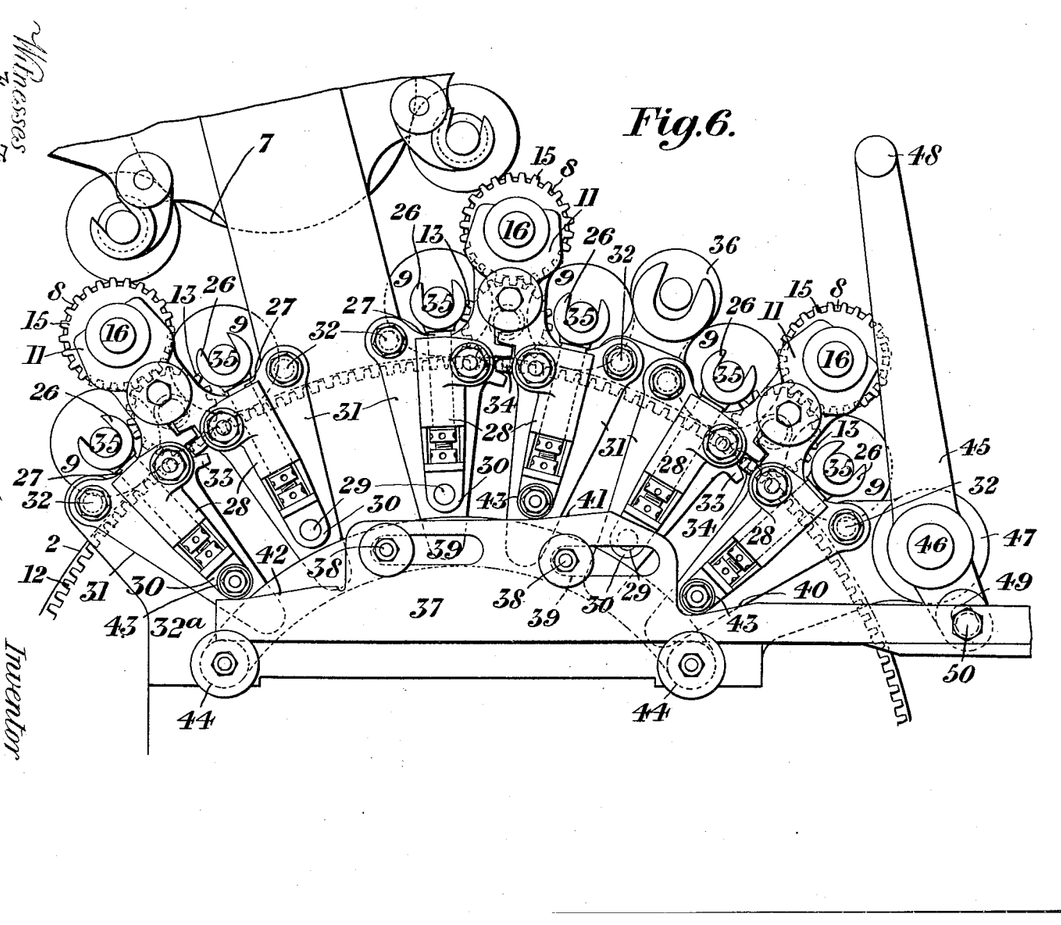
Fig. 6 is a side elevation, on an enlarged scale, of the vibrator-rollers.
Figure 7:
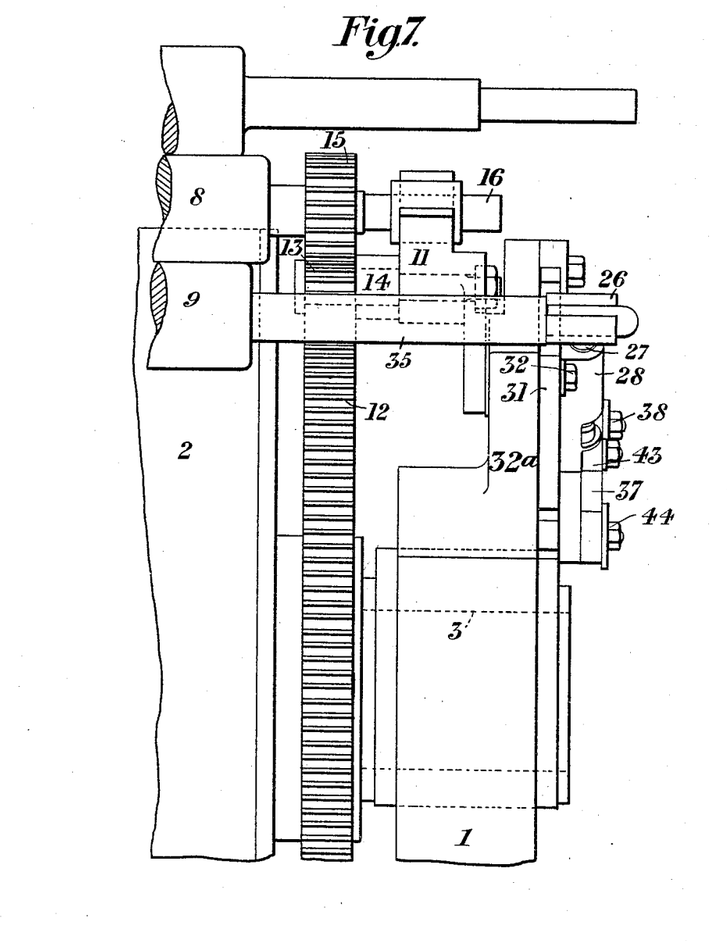
Fig. 7 is an end elevation taken from the left hand of Fig. 6.

The inking-rollers 9 are connected together in pairs by the end of the shaft 35 of each being journaled in the usual crutch 26, fast upon the top of a pin 27, fitting in a socket 28, held fast by a bolt 29, passed through a tab 30 on its end, to a plate 31, pivoted at 32 to a bracket $32^a$, fast to the respective side frame 1 of the machine, the axis of each pivot 32 being parallel with the axis of the printing-cylinder and nearer to the periphery of the latter than the pivots of the sockets 28. There is always an even number of inking-rollers—six is the one illustrated—consequently they can always be associated in pairs. According to the present invention, counting from either side of the printing-cylinder 2, two adjacent rollers 9 are associated in a pair by a gear 33 on one of the pair of plates 31 engaging with a similar gear 34 on the other plate 31 of the pair. The object of gearing the two plates 31 of a pair together in the way just described is to provide that the rocking of one of them shall rock the other of them through the same length of arc, but in the opposite direction. The relative position of a pivot 32 is important and must be as follows: The two pivots 32 of a pair of plates 31 are right and left of the respective pair of inking-rollers 9 and at the same radial distance from the axis of the printing-cylinder 2, and when an inking-roller 9 is in contact with both the printing-surface 10 and the respective vibrator-roller 8 the axis of each inking-roller 9 is inside a line bisecting both the respective pivot 32 and the axis of the respective vibrator-roller 8; but it is outside that line when the said roller 9 is in contact with the vibrator-roller 8 only. The terms "inside" and "outside" are to be understood as meaning radially nearer to or farther from the axis of the printing-cylinder 2. 36, Figs. 6 and 8, is the usual intermediate roller to transfer ink from the middle to the front pair of inking-rollers 9.

The tripping of the machine involves, as heretofore, the two acts of lifting the inking-rollers 9 off the printing-cylinder 2 and moving the impression-cylinder 4 away from it; but the present invention accomplishes these two acts at the same time and by a single means.

The improved tripping means are as follows: 37 is a cam-bar on each side of the machine. Each of these bars 37 is connected to the respective bracket 32ª by studs 38 passed through slots 39 into the said bracket, these slots being wider than the studs are thick. Each bar rests upon flanged antifriction-rollers 44 and upon which they can reciprocate horizontally. 40 41 42 are three cam-surfaces on each cam-bar, each surface engaging with an antifriction-roller 43 on one tab 30 of the combination of two inking-rollers 9 and the respective parts. As each tab 30 is fast to the respective plate 31 and the two plates 31 of a pair are geared together, it suffices if the cam-bar 37 engages with only one tab 30. So the single cam 40 trips the right-hand (looking at Fig. 6) pair of rollers 9, the cam 41 trips the middle pair, and the cam 42 the left-hand pair whenever the cam-bar 37 is moved to the left, its motion to the right leaving the inking-rollers free to be returned into operative position again by their own weight.

Further, the cam-bars 37 are adapted to trip the inking-rollers 9 independently of the impression-cylinder being tripped by their being connected to a hand-lever. 45 is this hand-lever. It is fulcrumed fast upon one end of a rock-shaft 46, turning in a lug 47, projecting from each bracket 32ª, its longer and upstanding arm presenting the grip 48 within convenient reach of the machine attendant. The opposite and shorter arm of the lever engages with the cam-bar 37 by a slot 49 in the said arm and a set-screw 50 passed through it into the said bar.

The machine is automatically tripped by a cam 51 on the axle 3 of printing-cylinder 2. The inking-rollers 9 and the impression-cylinder 4 are placed under the control of the cam 51 by the following means, which are shown best in Figs. 1, 3, 4, 5, and 6. 52 52 are the bearings of the shaft 5 of the impression-cylinder. Their peripheries are eccentric and are carried in boxes 53 53, carried by the side frames 1. Each bearing 52 has a radial arm 54 connected by a link 55 to an arm 56, fast upon a transverse shaft 57, turning in suitable bearings 58 on the base 59 of the machine. The arm 56, or preferably its boss 60, has two other radial arms, 61 62, one on each side of a stop 63, fast on the adjacent bearing 58. The function of these two arms 61 62 is to stop the arcual motion of the shaft 57 when it has reached its respective terminal position. This same shaft 57 carries, preferably on the feeder side of the machine, a loose-geared segment 64 and with which there gears a second segment, 65, on the outer end of a lever 66, fulcrumed at 67 on the respective side frame 1, its opposite end carrying an antifriction-roller 68, held in contact with the cam 51 already described. Each rotation of the printing-cylinder 2 will consequently rock the geared segment 64 on the shaft 57 once in each direction without rocking the shaft 57. This shaft 57 is made fast operatively to the segment 64 by means of radial abutments 69 70 on it and a pawl 71 pivoted on an arm 72, projecting from the boss 60 and capable of being rocked in front of either of the abutments 69 70 by a hand-lever 73. The engagement between the hand-lever 73 and the pawl 71 is constant and is by means of a stud 74, fast on the bottom end of the pawl and fitted with an antifriction-roller 75, which engages in a cam-groove 76 in the respective arm of the lever 73.

Each bearing 52 of the impression-cylinder 4 has a lateral stud 77, on which is pivoted a pawl having three arms 78, 79, and 80. The respective box 53 carries two stops 81 82, one on each side of the arm 80 and adjustable with reference thereto in brackets 83, fast on the said box 53. The remaining arms 78 79 cooperate, respectively, with the two abutments 84 85 on the respective cam-bar 37, already described. Only one of the two arms 78 or 79 is in contact with the cam-bar 37 at a time, that one being the one that has been rocked up in front of the respective abutment 84 or 85, as the case may be, by the preceding rock of the geared segment 64. Thus, referring to Fig. 3, the pawl-arm 79 had been in engagement with the abutment 85, during which the respective rock of the segment 64 had moved the cam-bars 37 to the right and finally making the pawl-arms 79 clear the abutments 85 and rocking the pawl-arms 78 up to the cambars 37, ready to engage their abutments 84. When, therefore, the pawl 71 is rocked by the lever 73 in front of the abutment 69 on the geared segment 64, which, it will be remembered, is loose on the shaft 57, the cam-groove 51 on the printing-cylinder 2 rocks the geared segment 64 in the direction of the arrow in Fig. 3, thereby making it turn the shaft 57 by reason of the engagement of the abutment 69 with the pawl 71, which is operatively fast to the arm 56. The consequent rock of this arm 56 to the right, acting through the link 55 and the arm 54, (see Fig. 5,) turns the eccentric bearings 52 in the boxes 53, thereby tripping the impression-cylinder 4. The same motion of the bearings 52 moves the pawl-arms 78 up to the abutments 84 and then moves the cam-bars 37 to the left, their motion in this direction making the cams 40, 41, and 42 (see Fig. 6) raise the inking-rollers 9 off the printing-cylinder 2. It should be mentioned in connection with the engagement of the two pawl-arms 78 and 79 with their respective abutments 84 and 85 that the stops 81 and 82 are adjusted in their brackets 83 so that the pawl-arm 80 shall engage with the respective stop to thereby rock the pawl-arm 78 or 79 then in engagement with its abutment 84 or 85 clear of the same at the moment when the cams 40, 41, and 42 have been moved far enough either to the right or to the left.

The boxes 53, above described as supporting the bearings 52 of the impression-cylinder 4, are adjustable longitudinally to regulate the impression made by the printing-surface 10 upon the sheets carried by the impression-cylinder 4.

I claim—

1. The combination with a printing-cylinder of pairs of inking-rollers; bearings in which each roller is supported and can turn independently of the others; pairs of plates pivoted on stationary pivots at points radially nearer to the axis of the printing-cylinder than are the axes of the respective inking-rollers and to the right and left respectively of the pairs of inking-rollers; a gear on each plate by which it engages with the other plate of the pair; cams adapted to rock the said plates to lift the inking-rollers off the printing-cylinder; and means for reciprocating the cams.

2. The combination with a printing-cylinder, of pairs of inking-rollers; bearings in which each roller is supported and can turn independently of the others; pairs of plates pivoted on stationary pivots at points radially nearer to the axis of the printing-cylinder than are the axes of the respective inking-rollers and to the right and left respectively of the pairs of inking-rollers; a gear on each plate by which it engages with the other plate of the pair; cams adapted to rock the said plates to lift the inking-rollers off the printing-cylinder; and a hand-lever for reciprocating the said cams.

3. The combination with a printing-cylinder, of pairs of inking-rollers; bearings in which each roller is supported and can turn independently of the others; pairs of plates pivoted on stationary pivots at points radially nearer to the axis of the printing-cylinder than are the axes of the respective inking-rollers; a gear on each plate by which it engages with the other plate of the pair; cams adapted to rock the said plates to trip the inking-rollers; means for tripping the impression-cylinder; automatic means for tripping both the inking-rollers and the impression-cylinder; and manual means for putting said automatic means into or out of action.

4. The combination with the printing-cylinder of a printing-machine, of inking-rollers and impression-cylinder both adapted to be tripped; mechanism for tripping them at the same time; a single cam on the printing-cylinder for actuating the said mechanism, and manual means for controlling the connection between the said cam and mechanism.

5. The combination with the printing-cylinder of a printing-machine; of inking-rollers and impression-cylinder adapted to be tripped; cams and cam-bar for tripping the inking mechanism; eccentric bearings for the impression-cylinder; means for turning the said bearings in either direction; cam on the printing-cylinder for actuating the said means; pawls on the eccentric bearings to actuate the cam-bar in either of two directions; and manual means for connecting the said means with the cam and for disconnecting them.

6. The combination with the printing-cylinder of a printing-machine, of inking-rollers adapted to be tripped by the longitudinal motion of a cam-bar; impression-cylinder adapted to be tripped by the arcual motion of its eccentric bearings; pawls pivoted upon the said eccentric bearings to move the cam-bar to and fro; a cam on the printing-cylinder to rock the eccentric bearings; a lever under the control of the said cam and provided with a quadrant-gear at its other end; an arm adapted to turn about a fixed axis; a loose-geared segment in engagement with the said quadrant-gear; a pawl pivoted upon a pivot rigidly connected with the said arm and capable of holding the loose-geared segment fast thereto; an arm on the respective eccentric bearing of the impression-cylinder; a link connecting both arms; and a hand-lever controlling the said pawl and adapted to rock it into and out of contact with the said loose-geared segment.

In witness whereof I have hereunto set my hand in the presence of two witnesses.

THOMAS M. NORTH.

Witnesses:
J. H. JOY,
T. R. G. PARKER.